United States Patent
Fukushima et al.

(10) Patent No.: US 8,521,795 B2
(45) Date of Patent: Aug. 27, 2013

(54) RANDOM NUMBER GENERATING DEVICE

(75) Inventors: Akio Fukushima, Ibaraki (JP); Hitoshi Kubota, Ibaraki (JP); Kay Yakushiji, Ibaraki (JP); Shinji Yuasa, Ibaraki (JP); Koji Ando, Ibaraki (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 641 days.

(21) Appl. No.: 12/452,012

(22) PCT Filed: Mar. 24, 2008

(86) PCT No.: PCT/JP2008/055368
§ 371 (c)(1),
(2), (4) Date: Dec. 11, 2009

(87) PCT Pub. No.: WO2008/152845
PCT Pub. Date: Dec. 18, 2008

(65) Prior Publication Data
US 2010/0131578 A1 May 27, 2010

(30) Foreign Application Priority Data
Jun. 12, 2007 (JP) .................................. 2007-155008

(51) Int. Cl.
*G06F 7/58* (2006.01)
(52) U.S. Cl.
USPC ....................................................... 708/250
(58) Field of Classification Search
None
See application file for complete search history.

(56) References Cited

U.S. PATENT DOCUMENTS

| | | | |
|---|---|---|---|
| 7,916,524 B2 * | 3/2011 | Happ et al. | 365/163 |
| 2006/0131413 A1 * | 6/2006 | Morita | 235/451 |
| 2007/0299894 A1 * | 12/2007 | Muraoka | 708/250 |
| 2009/0003044 A1 * | 1/2009 | Happ et al. | 365/163 |
| 2009/0249081 A1 * | 10/2009 | Zayas | 713/193 |
| 2010/0131578 A1 * | 5/2010 | Fukushima et al. | 708/250 |

FOREIGN PATENT DOCUMENTS

| | | |
|---|---|---|
| JP | 2000-284944 | 3/1999 |
| JP | 2003-015865 | 6/2001 |
| JP | 2003-108364 | 9/2001 |
| JP | 2004-030071 | 6/2002 |
| JP | 2005-018500 | 6/2003 |
| JP | 2005-085821 | 9/2003 |

OTHER PUBLICATIONS

International Search Report mailed Jun. 17, 2008.

(Continued)

*Primary Examiner* — David H Malzahn
(74) *Attorney, Agent, or Firm* — Stites & Harbison, PLLC; Juan Carlos A. Marquez, Esq.; Nicholas B. Trenkle, Esq.

(57) ABSTRACT

A random number generating device is constructed such that it has improved random number generation rate and allows for construction of compact circuit with ease.
The random number generating device includes a magnetoresistive element that has three layers consisting of a magnetization free layer, an interlayer, and a magnetization fixed layer, and has at least two resistance values depending on arrangement of magnetization in the magnetization free layer and the magnetization fixed layer, wherein the magnetoresistive element is subjected to be applied with a magnetization current so that the inversion probability of the magnetization free layer assumes a value between 0 and 1, through which the resistance value of the magnetoresistive element is extracted as random numbers.

12 Claims, 11 Drawing Sheets

(56) References Cited

OTHER PUBLICATIONS

A. A. Tulapurkar et al., "Subnanosecond Magnetization Reversal in Magnetic Nanopillars by Spin Angular Momentum Transfer", Applied Physics Letters, vol. 85, No. 22, Nov. 29, 2004, pp. 5358-5360.

Stuart S. P. Parkin et al., "Giant Tunnelling Magnetoresistance at Room Temperature with MgO (100) Tunnel Barriers", Nature Materials, vol. 3 (Dec. 2004), pp. 862-867.

Shinji Yuasa et al., "Giant Room-Temperature Magnetoresistance in Single-Crystal Fe/MgO/Fe Magnetic Tunnel Junctions", Nature Materials, vol. 3 (Dec. 2004), pp. 868-871.

Mahendra Pakala et al., "Critical Current Distribution in Spin-Transfer-Switched Magnetic Tunnel Junctions", Journal of Applied Physics, vol. 98 (2005), pp. 056107-1 through 056107-3.

Ryuji Ohba et al., "Si Nanocrystal MOSFET with Silicon Nitride Tunnel Insulator for High-Rate Random No. Generation", Proceedings of the IEEE Emerging VLSI Technologies and Architecture, (2006), 6 pages.

Ken Uchida et al., "Silicon Single Electron Tunneling Device Fabricated in an Undulated Ultrathin Silicon-on-Insulator Film", Journal of Applied Physics, vol. 90, No. 7 (Oct. 1, 2001), pp. 3551-3557.

Akio Fukushima et al., "A Random Number Generator by Current Induced Magnetization Switching," 70th National Conference of Information Processing Society of Japan, pp. 3-359 through 3-360 and 4 sheets of English translation, 2008.

* cited by examiner

| CURRENT VALUE (mA) | 3.0 | 3.2 | 3.4 |
|---|---|---|---|
| PROBABILITY OF INVERSION | 0.10 | 0.42 | 0.88 |
| RANDOM NUMBER SEQUENCE | 0 1 0 0 0 0 0 0 0 0 0 0 0 0<br>0 0 0 0 0 0 0 1 0 0 0 0 0 0<br>0 1 0 0 0 0 0 0 0 0 0 0 0 0<br>0 0 0 0 0 1 0 0 1 0 0 0 0 0<br>0 0 1 0 0 0 0 0 0 0 0 0 0 0<br>0 0 0 0 1 0 0 0 0 0 0 0 0 0<br>0 0 0 0 0 0 0 0 0 0 0 1 0 0<br>0 1 0 0 0 0 0 0 0 0 0 0 0 0<br>1 0 0 0 0 0 0 0 0 0 0 0 0 0 | 0 1 0 1 1 0 1 0 1 0 0 0 0 1<br>0 1 0 1 0 1 1 1 0 1 0 0 0 1<br>0 0 0 1 0 1 1 0 0 1 1 0 0 0<br>0 0 0 1 0 1 1 0 1 0 0 1 0 1<br>0 0 0 1 1 0 0 1 0 1 0 0 1 0<br>0 0 0 0 0 0 1 1 1 0 1 0 0 1<br>0 0 0 0 0 0 0 0 1 0 1 0 0 1<br>0 0 0 0 0 0 1 1 0 0 0 1 0 1<br>0 1 0 0 1 1 0 1 1 0 0 1 0 1<br>0 1 1 0 0 1 0 0 1 0 1 0 1 1 | 1 1 1 1 1 1 1 1 1 1 1 1 1 1<br>1 1 1 1 1 1 1 1 1 1 1 0 1 1<br>1 1 1 1 1 0 1 1 1 1 1 1 1 1<br>1 1 1 1 0 1 1 1 0 0 1 1 1 1<br>1 1 0 1 1 1 1 1 1 1 1 1 1 1<br>1 1 0 0 1 1 0 1 1 1 1 1 1 1<br>1 0 1 1 1 0 1 1 1 1 1 1 1 1<br>1 1 0 1 1 1 1 1 1 1 1 1 0 1<br>1 0 1 1 1 1 1 1 1 1 1 1 1 1<br>0 1 1 1 1 1 1 1 1 1 0 1 1 1 |

FIG.7

RANDOM NUMBER GENERATING DEVICE

TECHNICAL FIELD

The present invention relates to a random number generating device. More particularly, the present invention relates to a random number generating device that is small in size, needs little electricity to work, allows for easy integration, and also allows generated data to be retained in a nonvolatile manner.

BACKGROUND ART

Conventional methods for obtaining random numbers include a method in which pseudo random numbers are employed and a method in which natural random numbers are employed. The pseudo random numbers are obtained by generating random numbers using a predetermined program while natural random numbers are obtained by generating random numbers utilizing a probability event that occurs in nature. The probability event (a seed of natural random numbers) that can be used includes, for example, thermal noise (Johnson noise) in a resistor. The obtained thermal noise is amplified and compared with a predetermined threshold to obtain binarized random numbers.

Methods that have been proposed as providing a seed of natural random numbers having larger amplitudes include a method in which noise in tunnel junctions (a sum of thermal noise and shot noise) is used [see, for example, Patent Reference 1 (a random number generating circuit using thermal noise in a tunneling device)], a method in which thermal noise is amplified by a single electron transistor effect [see, for example, Patent Reference 2 (a random number generating device using single electron tunneling phenomenon); Non-Patent Reference 1 (experiments on trap and release of electrons in an ultrathin film SOI (silicon-on-insulator) transistor], and a method in which thermal noise is amplified by two negative resistive elements [see, for example, Patent Reference 3 (a random number generating circuit using a negative resistive element such as Esaki diode)].

Patent Reference 1: Japanese Patent Laid-open Publication No. 2003-108364
Patent Reference 2: Japanese Patent Laid-open Publication No. 2004-030071
Patent Reference 3: Japanese Patent Laid-open Publication No. 2005-018500
Non-Patent Reference 1: K. Uchida et al., "Silicon single electron tunneling device fabricated in an undulated ultrathin silicon-on-insulator film," J. Appl. Phys. No. 90 (2001), pp. 3551
Non-Patent Reference 2: R. Ohba et al., "Si Nanocrystal MOSFET with Silicon Nitride Tunnel insulator for High-rate Random Number Generator," IEEE Computer Society Annual Symposium on VLSI2006
Non-Patent Reference 3: M. Pakala et al., "Critical current distribution in spin-transfer-switched magnetic tunnel junctions," J. Appl. Phys. No. 98 (2005), pp. 056107K
Non-Patent Reference 4: [1] S. Yuasa et al., "Giant room-temperature magnetoresistance in single crystal Fe/MgO/Fe magnetic tunnel junctions," Nature Material No. 3 (2004), pp. 868. [2] S. S. Parkin et al., "Giant tunneling magnetoresistance at room temperature with MgO(100) tunnel barrier," Nature Material No. 3 (2004), pp. 862
Non-Patent Reference 5: A. A. Tulapurkar et al., "Subnanosecond magnetization inversion in magnetic nanopillars by spin angular momentum transfer," Appl. Phys. Lett. No. 85 (2004), pp. 5358.

SUMMARY OF THE INVENTION

Problem To Be Solved By the Invention

Pseudo random numbers are known to be inappropriate as true random numbers as they generate the same random numbers if the initial value is the same and have periodicity based on the number of registers in the computer used.

On the other hand, natural random numbers do not have the problem on trueness of random number. However, they have a problem as follows. When for example, thermal noise of a resistor is used as values of natural random numbers, the amplitude of the thermal noise is on the order of 1 microvolt at room temperature and hence there are required about $10^6$ amplifiers and appropriate threshold determining circuits in order to obtain binarized random numbers (for example, "1" being allotted to +3 volts and "0" being allotted to 0 volts) that match a general logic circuit. As a result, the random number generating circuit in whole has a large circuit configuration. Even when noise in a tunneling device is used as a seed of natural random numbers, the amplitude of the noise is increased only about 10-fold as compared with the case where the resistor is used as the thermal noise source. In view of the fact that amplifiers and threshold determining circuits are necessary in order to obtain binarized random numbers, it cannot be said that the problem of increased size of the circuit configuration has been obviated.

The circuit that amplifies thermal noise by the single electron transistor effect makes use of a change in conductance between the source and the drain to a considerable extent due to thermal disturbance of electrons trapped in the gate of a transistor that exhibits a single electron effect. This allows binarized random numbers to be obtained without amplifier circuits/threshold circuits. However, it has been reported that random numbers are generated due to random migration between two close-lying levels of the electrons trapped by the gate, so that the rate of generation of random numbers is on the order of 100 kilobits/second {see, for example, Non-Patent Reference 2 [high-rate random number generator with ultrathin film SOI (silicon-on-insulator) transistor having a single electron effect]}. Therefore, there arises a problem that it is difficult to achieve a necessary operation rate.

The circuit that amplifies thermal noise by two negative resistive elements requires that threshold currents of the two negative resistive elements will precisely agree with each other within the amplitude (approximately 1 nano ampere or less) of the current due to thermal noise. Therefore, there arises a problem that it is difficult to select a pair of negative resistive elements for a random number generator. Such a circuit has not been put into practice yet.

In view of the above-mentioned problems, it is an object of the present invention to provide a random number generating device that has an increased rate of generating random numbers and allows the circuit to have a compact configuration and be fabricated with ease.

Further, it is another object of the present invention to solve the above-mentioned problems and provide a random number generating device that is small in size, needs little electricity to work, and also allows generated random numbers to be retained in a nonvolatile manner.

Means For Solving the Problem

First, the idea that has led to the present invention is explained.

A magnetoresistive element with a laminate structure consisting of a magnetization fixed layer, an interlayer, and a magnetization free layer is an element whose resistance changes depending on directions of magnetization of the magnetization fixed layer and the magnetization free layer. Hence, it is possible to fabricate a magnetoresistive element that assumes two values of resistance consisting of a value corresponding to a high resistance state (antiparallel state) and a value corresponding to a low resistance state (parallel state) by exploiting magnetization properties. Such a magnetoresistive element can be used as a memory in a computing machine. At present, it is put into practical use as a magnetic random access memory.

Heretofore, magnetic fields have been used for controlling magnetization of the magnetization free layers of magnetoresistive elements. In recent years, however, it has been made clear that in a micro-magnetoresistive element (with a size on the order of 100 nm square or smaller), the direction of magnetization of the magnetization free layer can be controlled with an electrical current. This phenomenon is called "spin-polarized current injection magnetization inversion" (or "current-induced magnetization inversion"). A magnetoresistive element that uses current-induced magnetization inversion requires no complicated external circuit for magnetization inversion unlike the conventional magnetic field-induced magnetization inversion-type magnetoresistive elements, and it has attracted attention as a component element for high-density magnetic random access memories and research and development thereof is currently under way vigorously. FIG. 1 illustrates an example of measurement of a current-induced magnetization inversion-type magnetoresistive element. FIG. 2 illustrates a resistance characteristic against magnetic field and a resistance characteristic against current, for the magnetoresistive element.

As shown in FIG. 1, a magnetoresistive element 41 having a magnetization free layer 42, an interlayer 43, and a magnetization fixed layer 44 laminated in order is connected to a voltmeter 47 and a current source 48. Current 45 and a magnetic field 46 are applied to the magnetoresistive element 41 as shown in FIG. 1 and changes in resistance of the element are measured.

FIG. 2 illustrates hysteresis characteristics consisting of a high resistance value state 49 and a low resistance value state 50, both of which become stable depending on a change in current or voltage.

In the course of research on the current injection magnetization inversion, the inventors of the present invention have found out that the inversion of magnetization of a magnetization free layer occurs stochastically and provides a promising seed for natural random numbers. Further, they have found out that the probability of inversion can be controlled with ease by means of an external field or fields (current and/or magnetic field) and results of the inversion can be retained in a nonvolatile manner. In its application to magnetic memories, an operation method in which the probability of inversion is as close to 1 as possible is important in order to minimize erroneous actions. In the present invention, it is important to realize an operation method in which the probability of inversion is approximately 0.5 for generating random numbers.

The conventional magnetoresistive elements use saturated areas of the magnetization inversion characteristics when they are employed as sensors and the like (for example, when they are used for magnetic heads of hard disks) and no attention has been attracted on the characteristics of transient areas in the course of one saturated area to another.

In order to achieve the above-mentioned objects, the inventors of the present invention have examined the characteristics of magnetoresistive elements for which high-rate actions are expected.

As a result, they have had new insight that such a magnetoresistive element has the following characteristics:
(1) As characteristics of transient areas in the course of transition from one to another of both saturated areas in magnetization characteristics, the probability of inversion varies substantially linearly with a change in magnetization inversion current.
(2) In addition, the characteristics of inversion that the probability of inversion varies substantially linearly with the change in the magnetization inversion current changes such that the inclination of the characteristic curve becomes moderate as the thermal stability index is decreased, and it becomes easy to specify the value of magnetization inversion current at which the probability of inversion is 50%.

This indicates that the characteristics during inversion of magnetization inversion in the magnetization characteristics that had heretofore been overlooked were analyzed to find out the above-mentioned characteristics. This finding revokes the conventional method of using the magnetization characteristics according to common sense and the concept by itself is novel.

Therefore, in order to achieve the above-mentioned objects, the present invention provides a random number generating device that enables one to obtain random numbers with high trueness at high rates and in a nonvolatile manner by using the probability of inversion of the magnetization free layer in a magnetoresistive element as a seed of natural random numbers.

In other words, the random number generating device according to the present invention comprises means for generating a random number including a magnetoresistive element having a laminate structure consisting of a magnetization fixed layer, an interlayer, and a magnetization free layer, and means for applying an external field (current and/or magnetic field) that adjusts the probability of inversion of the magnetization free layer between "0" and "1".

In a magnetoresistive element having a laminate structure consisting of a magnetization fixed layer, an interlayer, and a magnetization free layer, the orientation of magnetization of the magnetization free layer can be controlled with respect to the orientation of magnetization of the magnetization fixed layer and resistance values of the magnetization free layer can be brought into binary states consisting of a high resistance state (antiparallel state) and a low resistance state (parallel state) by applying an external magnetic field or direct current.

In the magnetoresistive element, inversion of magnetization of the magnetization free layer is a stochastic phenomenon and its probability varies depending on the magnitude of direct current and time during which this direct current is applied, or on the magnitude of the external magnetic field and time during which this magnetic field is applied.

According to the present invention, binarized random numbers can be obtained with ease in a nonvolatile manner without using a large-scale construction such as a conventional amplifier/threshold circuit by using fluctuation of the magnetization free layer of the magnetoresistive element as a seed of random numbers, applying direct current or an external magnetic field such that the probability of inversion of magnetization of the magnetization free layer is a value between 1 and 0 (preferred probability of inversion being about 0.5), and then reading out a resistance value of the element.

Further, since an appropriate magnetization current can be set with ease based on the characteristic that the inclination of the curve becomes moderate irrespective of the shape of the magnetoresistive element, it is easy to reduce the size of the magnetoresistive element to less than 1 micrometer square, so that it is easy to make an array of elements by the existing integrated circuit technologies. The magnetoresistive element according to the present invention uses very low power; energy required for generating 1 bit of random number is 1 nanojoule or less when a CPP-GMR element (an element exhibiting a giant magnetoresistive effect by flowing current perpendicular to the film surface) is used and 10 nanojoules or less when an MgO-TMR element (a tunneling magnetoresistive element with magnesium oxide as the interlayer) is used. Judging from the rate of inversion of magnetization (on the order of 1 nanosecond), random number generation rate on the order of 100 megabits/second (1,000 times the conventional rate or higher) can be obtained.

From the above, means for solving according to the present invention specifically includes the following:

(1) The random number generating device comprises a magnetoresistive element that has three layers consisting of a magnetization free layer, an interlayer, and a magnetization fixed layer and has at least two resistance values depending on arrangement of magnetization in the magnetization free layer and the magnetization fixed layer, wherein the magnetoresistive element is adapted to generate resistance values that are taken as random numbers when an external field is applied to the magnetoresistive element such that the probability of inversion of the magnetization free layer takes any desired value between 0 and 1.

(2) The random number generating device according to (1) above is featured in that the magnetoresistive element is a current-perpendicular-to-plane magnetoresistive element.

(3) The random number generating device according to (1) above is featured in that the magnetoresistive element is a tunneling magnetoresistive element.

(4) The random number generating device according to (3) above is featured in that the magnetoresistive element is a tunneling magnetoresistive element with magnesium oxide as the interlayer.

(5) The random number generating device according to (4) above is featured in that at least one of the magnetization free layer and the magnetization fixed layer of the tunneling magnetoresistive element comprises a Co—Fe—B based material.

(6) The random number generating device according to any one of (1) to (4) above is featured in that at least one of the magnetization free layer and the magnetization fixed layer of the magnetoresistive element comprises a perpendicular magnetic material.

(7) The random number generating device according to any one of (1) to (4) above is featured in that at least one of the magnetization free layer and the magnetization fixed layer of the tunneling magnetoresistive element comprises a Heusler alloy material.

(8) The random number generating device according to any one of (1) to (7) above is featured in that the external field applied to invert the magnetization orientation in the magnetization free layer of the magnetoresistive element is current, and wherein the probability of inversion of the magnetization free layer is adjusted to any desired value based on time during which the current is applied and magnitude of the current.

(9) The random number generating device according to (8) above is featured in that variance of magnetization inversion current in the magnetization free layer of the magnetoresistive element is adjusted to any desired value within the range of 0.1% to 30% with respect to a mean inversion current value.

(10) The random number generating device according to any one of (1) to (9) above is featured in that the magnetoresistive element further comprises resetting means to reset magnetization orientation of the magnetization free layer with respect to the magnetization fixed layer and current setting means to set a value of current that inverts magnetization of the magnetoresistive element.

(11) The random number generating device according to any one of (1) to (7) above is featured in that an external magnetic field is applied to the magnetoresistive element as the external field that inverts the magnetization orientation of the magnetization free layer and wherein the probability of inversion of the magnetization free layer is adjusted to any desired value based on time during which the current is applied and magnitude of the current.

(12) The random number generating device according to any one of (1) to (11) above is featured in that a thermal stability index of the magnetization free layer of the magnetoresistive element is set to any desired value within the range of 3 to 100, the thermal stability index being defined to be a ratio $(K_u \cdot V)/(k_B \cdot T)$ of magnetic anisotropic energy $K_u \cdot V$ ($K_u$: magnetic anisotropy energy per unit volume, V: volume of the magnetization free layer) to environment thermal energy $k_B \cdot T$ ($k_B$: Boltzmann constant, T: absolute temperature).

(13) The random number generating device according to any one of (1) to (12) above is featured in that when probability of generation of 0 or 1 differs from a predetermined value, the random number outputs of two independent measurements are fetched and wherein "0" is output corresponding to a set of success of inversion-failure of inversion and "1" is output corresponding to a set of failure of inversion-success of inversion.

Advantageous Effect of the Invention

The random number generating device according to the present invention is compact, achieves decreased consumption of power, and allows for high-rate action and retention of generated random numbers in a nonvolatile manner.

With the random number generating device according to the present invention, fluctuations of the magnetic free layer in the magnetoresistive element due to an external field are used as a seed of random numbers, so that binarized random numbers with high trueness can be generated at high rates without using large-scale amplifiers and threshold circuits and the resultant data can be retained in a nonvolatile manner.

Independently of the shape of the magnetoresistive element, appropriate magnetization current can be set with ease based on the characteristic that the inclination becomes moderate independently of the shape of the magnetoresistive element. Therefore, it is possible to reduce the size of the magnetoresistive element to less than 1 micrometer square and the random number generating device according to the present invention can be arrayed by using the existing integrated circuit technologies. In addition, the magnetoresistive element can be designed so as to use very low electricity such that the energy required to generate 1 bit of a random number is no greater than 1 nanojoules when a CPP-GMR element is used or no greater than 10 nanojoules when an MgO-TMR element is used. Further, judging from the rate (on the order of 1 nano second) of inversion of magnetization, a random number generating rate on the order of 100 megabits/second (by at least 1,000 times faster than conventionally) can be obtained.

According to the present invention, a random generating device can be realized, which is small in size, needs little electricity to work, and allows for generation of random numbers with high trueness at high rates and in a nonvolatile manner. By incorporating the random number generating device in IC cards, cellular phones, portable computers, and so on, systems with high security can be realized. Thus, the present invention provides enormous industrial merits.

In a magnetoresistive element, the inversion of magnetization of the magnetization free layer is a probabilistic event and its probability varies depending on the magnitude of direct current and time during which this direct current is applied or on the magnitude of external magnetic field and time during which this external magnetic field is applied. In the present invention, binarized random numbers can be obtained in a nonvolatile manner without using large-scale amplifiers/threshold circuits by using fluctuations of the magnetic free layer in the magnetoresistive element due to an external field as a seed of random numbers, applying direct current or an external magnetic field to the magnetoresistive element such that the probability of inversion of the magnetization free layer is any desired value between 1 and 0 (preferably about 0.5), and then reading out resistance values of the element.

Since the size of the magnetoresistive element can be reduced to less than 1 micrometer square, it is easy to make an array of the elements by the existing integrated circuit technologies.

BRIEF DESCRIPTION OF THE DRAWINGS

FIG. 7 shows a diagram indicating an example of experimental result on the random number generating device according to the second embodiment of the present invention;

DESCRIPTION OF REFERENCE NUMERALS

Figure 1:
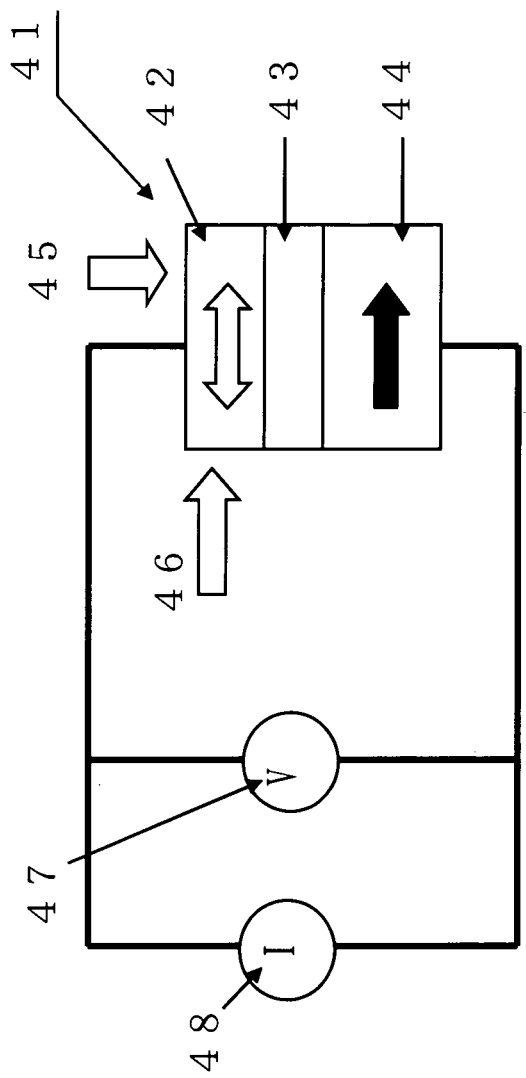
FIG. 1 shows a diagram illustrating the construction of a random number generating device.
Figure 2:
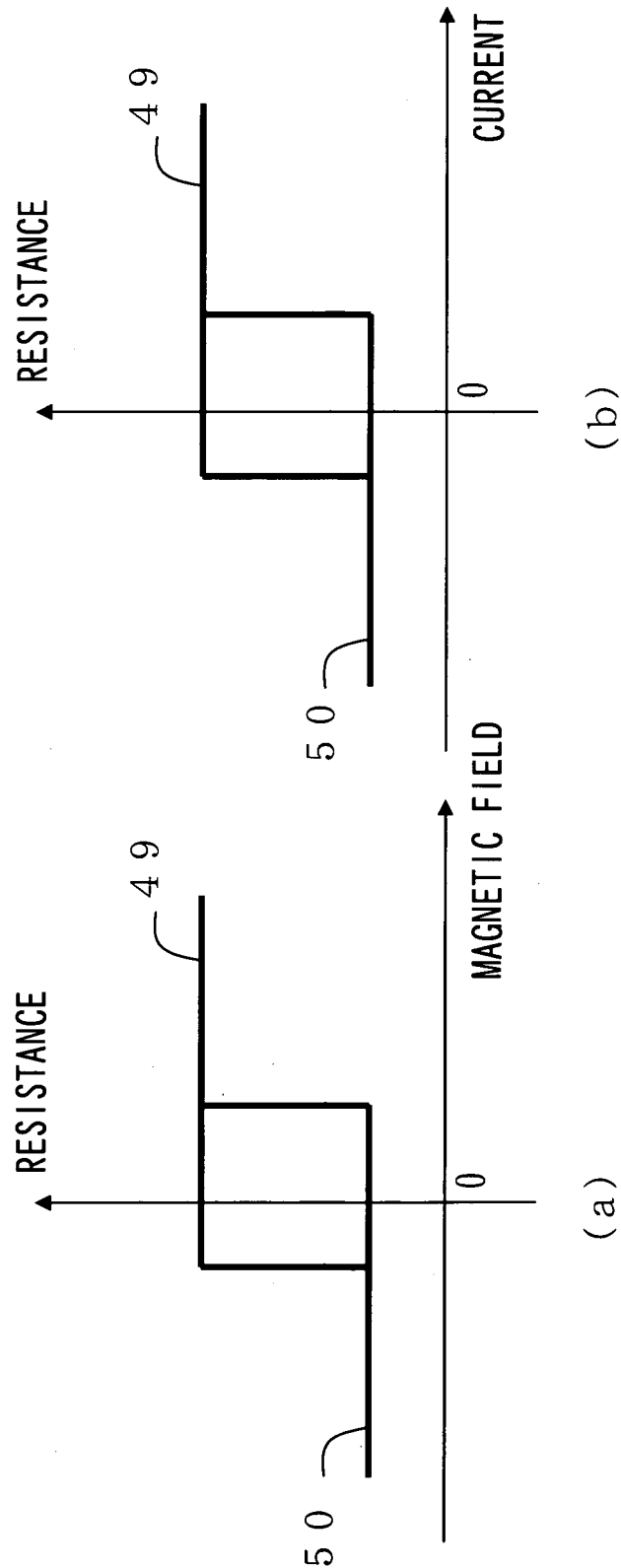
FIG. 2 shows diagrams illustrating a relationship of a resistance to magnetic field and a relationship of a resistance to current.

1 random number generating device
2 magnetoresistive element
3 buffer amplifier
4 variable gain amplifier
5 comparator
6 integrator
7 error amplifier
8 random number selection circuit

BEST MODE FOR CARRYING OUT THE INVENTION

Embodiments of the present invention are explained in detail with reference to the attached drawings.
First Embodiment
Hereinafter, examples of random number generating devices according to embodiments according to the present invention are explained with reference to the attached drawings.
(Example in which a CPP-GMR Element is Used)

In an experiment of current injection magnetization inversion, for which as a magnetoresitive element a CPP-GMR element (i.e., an element having electrodes on upper and lower sides of a GMR (Giant Magneto Resistance) sensor film to allow current to flow perpendicularly to the film surface) is used, it is indicated that the probability of inversion of the magnetization free layer can be controlled.

Figure 3:
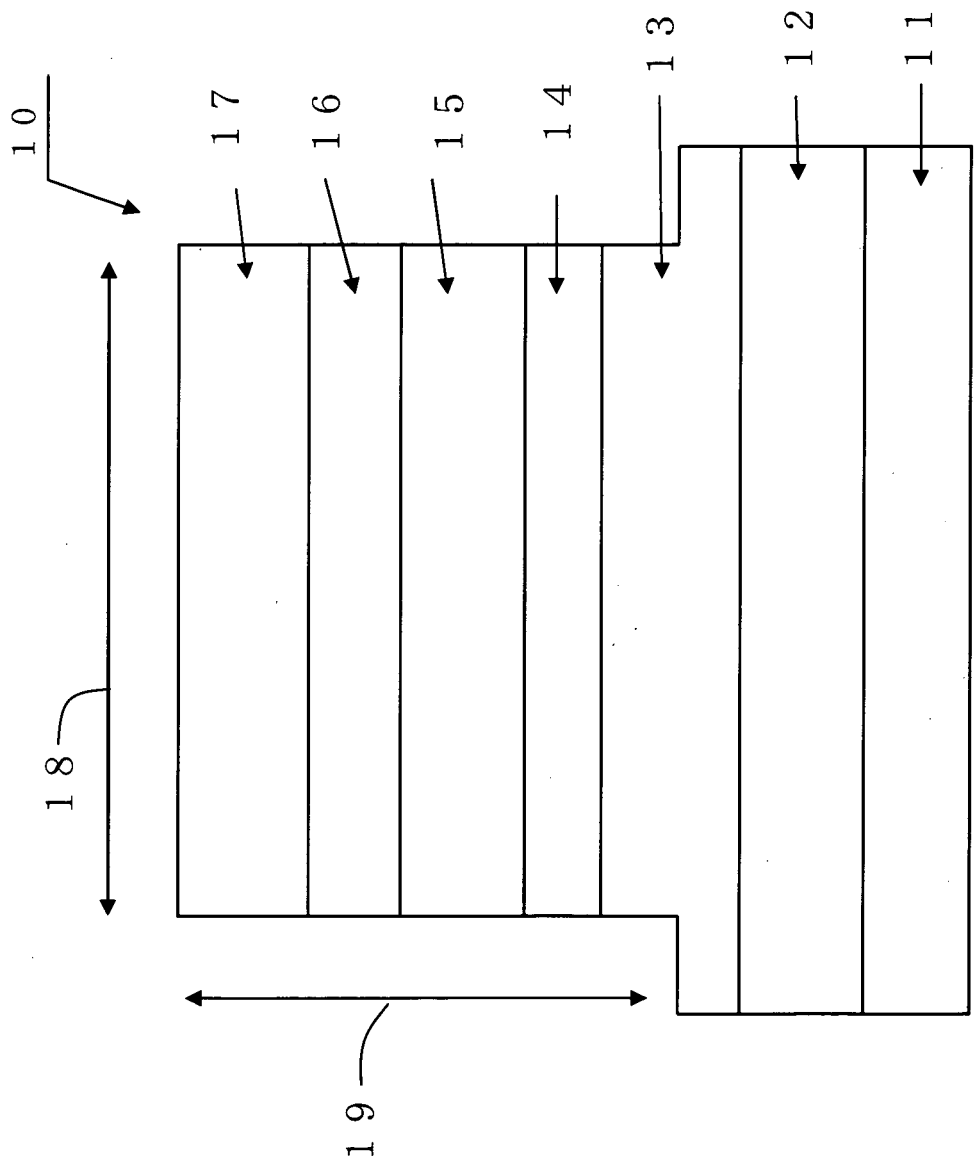
FIG. 3 shows a construction diagram illustrating a CPP-GMR element used in an experiment of a random number generating device according to a first embodiment according to the present invention.

FIG. 3 shows a construction diagram illustrating a CPP-GMR element used in this experiment.

A CPP-GMR element 10 shown in FIG. 3 has a construction that includes a substrate 11 having laminated thereon in order a buffer layer 12, an antiferromagnetic layer 13, a magnetization fixed layer 14, which is a 2.5-nm-thick Co—Fe layer, an interlayer 15, which is a 6-nm-thick Cu layer, a magnetization free layer 16, which is a 3-nm-thick Co—Fe—B layer, and a cap layer 17, with a portion of the layer 13 and side surfaces of the layers 14 to 17 being etched to provide a structure having a cross-sectional area (18) of 70×200 nm and an etched side of etch deepness (19) over a length of 30 nm extending from an upper surface of the cap to the antiferromagnetic layer.

The element 10 has a perpendicular-to-plane columnar structure with a cross-sectional area of about 70×200 nm and a thickness of the columnar portion of about 30 nm. The Co—Fe layer that is in contact with the underlying antiferromagnetic layer 13 is the magnetization fixed layer 14 and the overlying Co—Fe—B layer is the magnetization free layer 16. The magnetic resistance ratio of this element is about 0.5% and the value of current at which magnetization inversion occurs is about 6 to 12 milliamperes.

Figure 8:
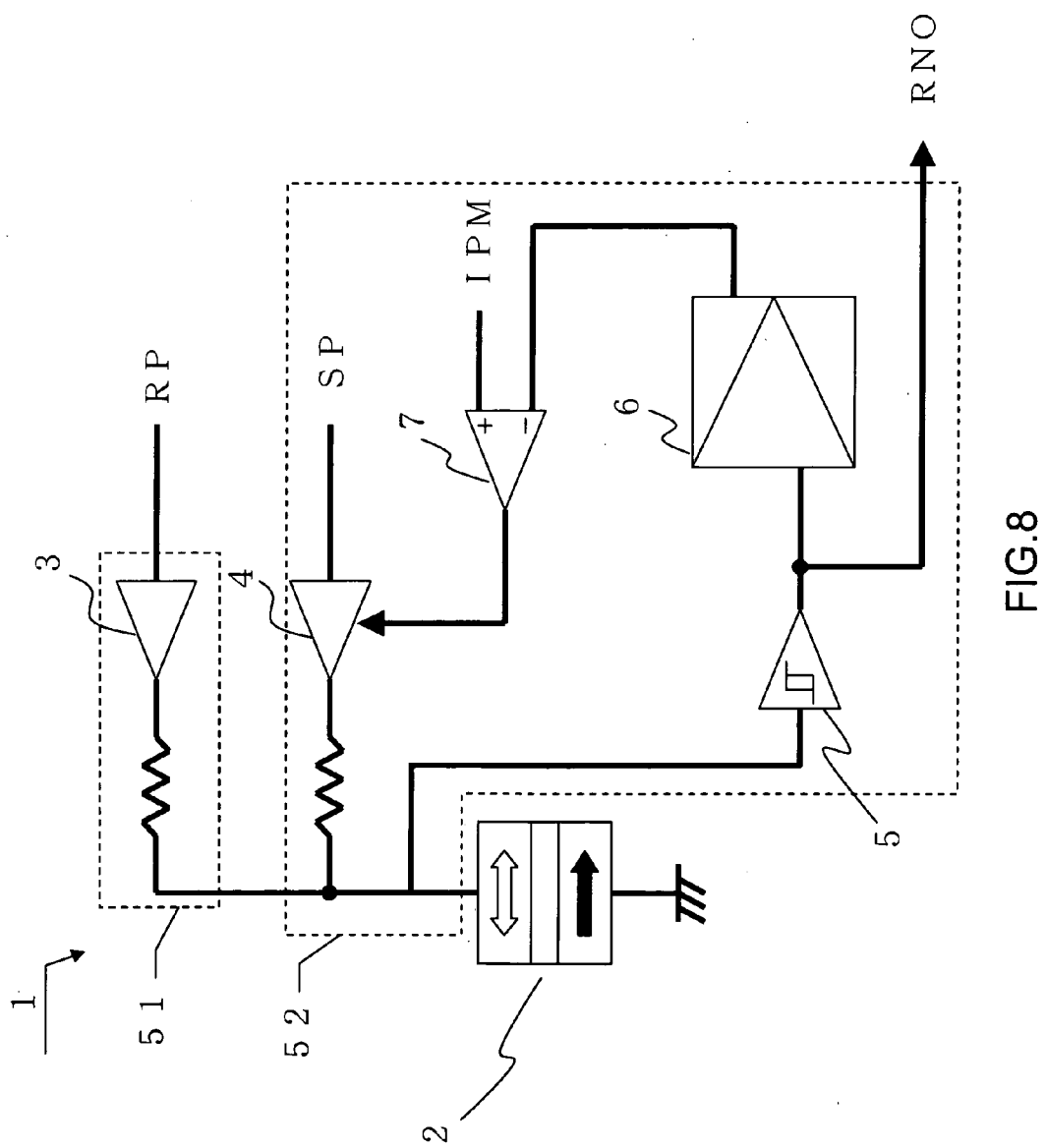
FIG. 8 shows a diagram illustrating an example of a circuit in the random number generating device according to the second embodiment of the present invention.

Here, the magnetoresistive element was applied to the circuit shown in FIG. 8 and pulsed direct current with a duration of 100 milliseconds was used to initialize magnetization. Then, the current value was gradually increased and probability of magnetization inversion of the magnetization free layer 16 was examined.

The Co—Fe—B based material as used herein is constituted by, for example, a Co—Fe—B alloy and an alloy composed of Co—Fe—B and at least one element selected from Ni, V, Mo, Cr, for example Co—Fe—B—Ni.

Figure 4:
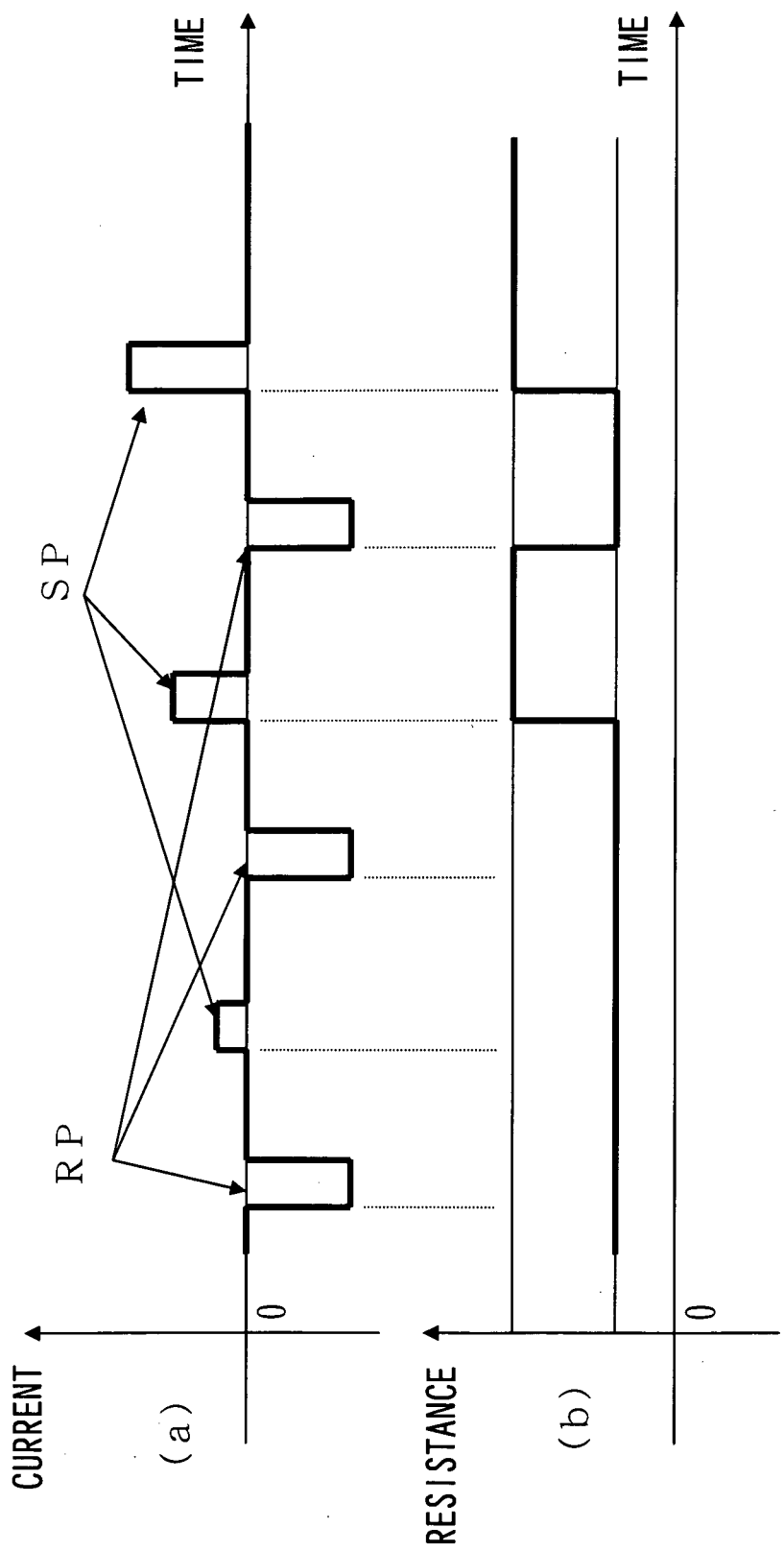
FIG. 4 shows diagrams illustrating an example of the procedure of experiment on a random number generating device according to a first embodiment of the present invention.

FIG. 4 illustrates time variation characteristics of pulsed current used in the experiment according to the procedure of experiment. FIG. 4 shows a sequence diagram of magnetization inversion experiment including a diagram illustrating (a) a current characteristics against time consisting of a reset pulse RP and a set pulse SP and a diagram illustrating (b) a resistance characteristics against time.

As shown in FIGS. 4 and 8, the orientation of the magnetization free layer is aligned in advance in a direction parallel to the orientation of the magnetization of the magnetization fixed layer with negative current pulses. Here, the direction of current is defined such that a current that flows from the magnetization free layer to the magnetization fixed layer is a negative current. Then, current pulses in the positive direction are given and it is determined whether magnetization is inversed based on changes in the resistance values. That is, the current values of negative reset pulses are set to be of the same magnitude and the current values of the positive set pulses are discretely increased. The reset pulses and the set pulses are alternately applied as shown in FIG. 4(a) and changes in resistance values of the element are observed as shown in FIG. 4(b) and magnetization inversion is determined.

Figure 5:
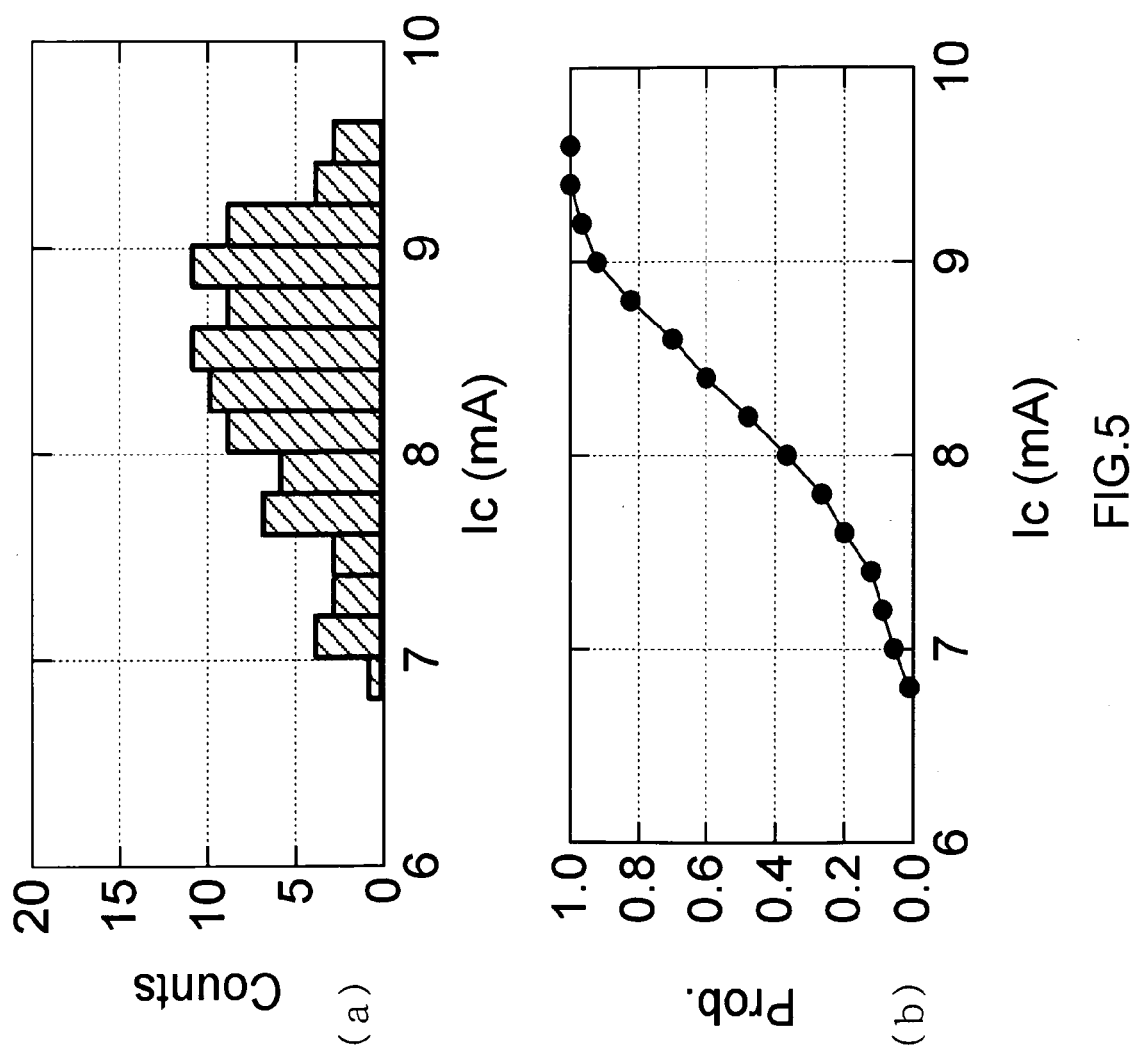
FIG. 5 shows diagrams illustrating relationship between variance of inversion current and accumulated inversion probability in a CPP-GMR element.

An example of the result is shown in FIG. 5. FIG. 5 is a diagram illustrating variance of magnetization inversion current and accumulated inversion probability. FIG. 5(a) is a Counts (cumulative inversion number) characteristic against magnetization inversion current, and FIG. 5(b) is Prob. (cumulative inversion probability) characteristic against magnetization current.

FIG. 5(b) indicates that the cumulative inversion probability varies substantially linearly with respect to current value. That is, magnetization inversion current Ic at which the cumulative inversion probability is 0.5 can be identified.

According to a thermal activity model, it is observed that a ratio of an increase in cumulative inversion probability to current value (inclination of the curve shown in FIG. 5) decreases as a thermal stability index decreases, so that it becomes easier to select a current value for a desired inversion probability. Here, thermal stability index is defined by a ratio $(K_u \cdot V)/(k_B \cdot T)$ of magnetic anisotropic energy $K_u \cdot V$ ($K_u$: magnetic anisotropic energy per unit volume, V: volume of the magnetization free layer) to environment thermal energy $k_B \cdot T$ ($k_B$: Boltzmann constant, T: absolute temperature).

According to a thermal activity model, variance of inversion current in spin injection magnetization inversion is considered to be ascribable to thermal noise. That is, uncertainty of inversion at a specified current value is due to thermal noise, which indicates that the random numbers generated according to the present invention fall in the category of natural random numbers.

The results shown in FIG. 5 indicate that magnetization inversion occurs stochastically at current values between 7 to 9.5 milliamperes and that cumulative probability of magnetization inversion is 0.5 at a current value of about 8.3 milliamperes. CPP-GMR elements fabricated on the same wafer were subjected to similar experiments. The results indicate that magnetization inversion occurs not at a certain fixed current value but within a finite current value range stochastically, the variance of inversion current is such that variance (1 σ) of magnetization inversion current of the magnetization free layer is several percents (%) to more than ten percents (%) of the inversion current value (for example, about 8% in the example shown in FIG. 5), and cumulative inversion probability increases monotonically near a mean value of the inversion current.

The experimental facts mentioned above indicate that the magnetoresistive element can serve as a random number generating device that provides a low resistance state (i.e., an event corresponding to "0") and a high resistance state (i.e., an event corresponding to "1") each at a probability of 0.5 and that if the probability of generation is deviated from 0.5, the probability of inversion can be made as close to 0.5 as possible without limit by adjusting current value. This is the essential feature of the present invention.

In the case of the random number generating device according to the present invention, the inversion probability can be adjusted with ease by using a magnetoresistive element whose variance (1 σ) of magnetization inversion current of the magnetization free layer is set to a desired value between 0.1% and 30% of a mean value of inversion current (mean inversion current value).

The magnetoresistive element is adjusted, so that the variance (1 σ) of magnetization inversion current of the magnetization free layer is set to a desired value between 0.1% and 30% of the mean value of inversion current (mean inversion current value).

The inversion probability of the magnetization free layer is adjusted to any desired value by applying an external magnetic field that allows the magnetization direction of the magnetic free layer of the magnetoresistive element depending on time in which the external magnetic field is applied and magnitude of the external magnetic field.

It is known that the variance of inversion current during current injection magnetization inversion is in a good proportional relationship with thermal stability index of the magnetization free layer when the magnetization inversion can be approximated by a thermal activation model (see, for example, Non-Patent Reference 2 (Experiments on distribution of critical current in current injection magnetization inversion in a tunneling magnetoresistive element). The case where the magnetization inversion can be approximated by a thermal activation model is considered to be a case where the width of current pulse is sufficiently longer than the eigenfrequency of the magnetization free layer (approximately on the order of 1 nano second for Co—Fe based materials). According to the above-mentioned model, it is indicated that the variance of inversion current is smaller for a greater thermal stability index. It was revealed that thermal stability index for the variance of inversion current is estimated to be about 3 to 100. Therefore, the adjustment of inversion probability is made easier by using a magnetoresistive element whose thermal stability index is between 3 and 100 in the random number generating device according to the present invention.

Second Embodiment (Example in which MgO-TMR Element is Used)

In 2004, Yuasa, Parkin et al. found that a tunnel magnetoresistive element (MgO-TMR element) having an interlayer composed of crystalline magnesium oxide exhibits giant tunneling magnetoresistance (see Non-Patent Reference 4 (Experiment on a tunneling magnetoresistive element having giant magnetoresistance with an MgO barrier layer)). Thereafter, extensive research has been made on giant tunneling magnetoresistance in an MgO-TMR element. At present, it has become possible to obtain a magnetoresistance ratio of from several tens percents (%) to hundred and several tens percents (%) even in a low resistance region (i.e., region in which the sheet resistance value is on the range of several $\Omega\mu m^2$.

In such a low resistance MgO-TMR element, current injection magnetization inversion is possible. By using a low resistance MgO-TMR element in the random number generating device according to the present invention, an output of random number (change in magnetoresistance ratio) can be increased by two orders of magnitude or more, so that the circuit can be simplified.

Here, explanation is made on an experiment in which an MgO-TMR element is used as a magnetoresistive element.

Figure 6:
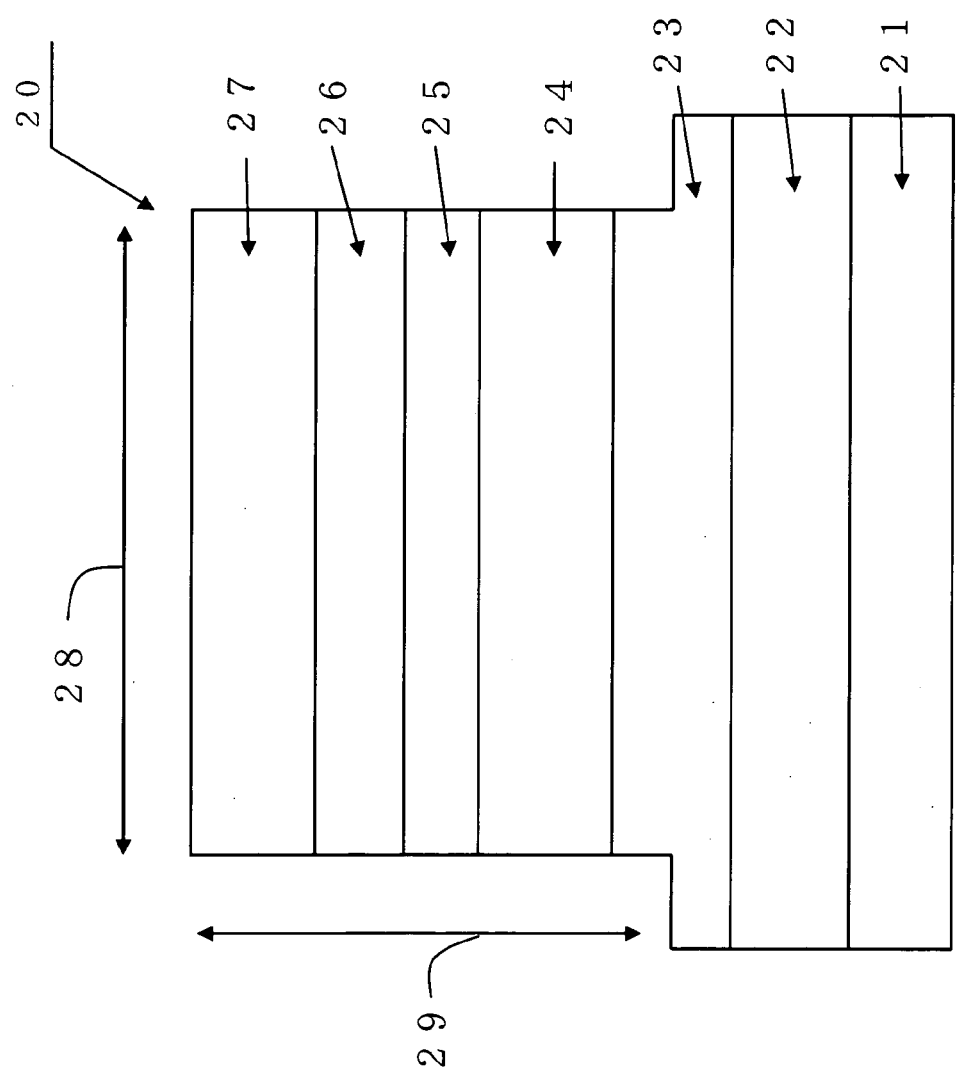
FIG. 6 shows a construction diagram illustrating an MgO-TMR element used in an example on a random number generating device according to a second embodiment of the present invention.

FIG. 6 shows a construction diagram of the MgO-TMR element used.

The laminate structure except for the composition of material of the MgO-TMR element is the same as the above-mentioned CPP-GMR element. A Co—Fe—B—Ni (cobalt-iron-boron-nickel) alloy which has less magnetostriction was used for the magnetization free layer in order to increase durability of the element.

An MgO-TMR element 20 shown in FIG. 6 includes a substrate 21 having laminated thereon in order a buffer (layer) 22, an antiferromagnetic layer 23, a magnetization fixed layer 24, which is a 6-nm-thick Co—Fe—B layer, an interlayer 25, which is a 1-nm-thick MgO layer, a magnetization free layer 26, which is a 2-nm-thick Co—Fe—B—Ni layer, and a cap layer 27, with a portion of the layer 23 and side surfaces of the layers 24 to 27 being etched to provide a columnar structure having a cross-sectional area (28) of 70×200 nm and an etched side with etch depth (29) of 30 nm extending from an upper surface of the cap to the antiferromagnetic layer.

The magnetoresistance ratio of the fabricated element is at most about 60%. The value of current at which magnetization inversion occurs is about 2 to 6 milliamperes. Pulsed direct current of 100 microseconds width has been applied to this element to initialize magnetization and then the resulting inversion and inversion probability have been examined, while a value of current for inverting magnetization (hereafter, referred to as "set current") is retained constant. The procedure of providing pulses is the same as the one shown in FIG. 4.

FIG. 7 indicates results of the experiment. FIG. 7 illustrates examples of inversion probability and random number in the MgO-TMR element according to Second Embodiment at the set current values (mA).

It is shown that when the set current has been increased from 3.0 through 3.2 to 3.4, the inversion probability has increased from 0.10 through 0.42 to 0.88 accordingly. The cumulative inversion probability characteristic against magnetization inversion current- shown in FIG. 5(b) has a substantially linear inclination. From this it follows that the inversion probability can be made 0.5 by further adjusting current near the set current value of 3.2 milliamperes.

Based on the above-mentioned results of experiment, an example of circuitry of a random number generating device provided with means for making the inversion probability 0.5 was fabricated, which is shown in FIG. 8.

FIG. 8 is a circuit configuration of a random number generating device according to the present invention.

In a random number generating device 1 shown in FIG. 8, a substrate on the side of the magnetization fixed layer of a magnetoresistive element 2 is grounded. An output side of a buffer amplifier 3 for inputting a reset pulse SP, an output side of a gain variable amplifier 4 for inputting a set pulse SP, and an output side of a comparator 5 for extracting the random number output RNO are connected to a cap on the side of the magnetization free layer of the magnetoresistive element 2. The output from the comparator 5 is extracted as the random number output RNO and is input into an integrator 6. The output from the integrator 6 is input into one (−) of input terminals of an error amplifier 7. Into another input terminal (+) of the error amplifier 7 is input a mean value of inversion probability IPM (for example, "0.5"). The output of the error amplifier 7 is input into the gain variable amplifier 4 to adjust gain variably. Here, the buffer amplifier 3 connected to the magnetoresistive element 2 constitutes reset means 51. In the circuit shown in FIG. 8, the circuit portion excluding the buffer amplifier 3 and the magnetoresistive element 2 constitute set current setting means 52.

When in operation, first a reset pulse RP with a large current value as shown in FIG. 4(a) is applied to the magnetoresistive element 2 through the buffer amplifier 3 to align the magnetization direction of the magnetization free layer to the magnetization direction of the magnetization fixed layer to obtain an initialized state. On this occasion, the resistance value is a low value (low resistance state). In this initialized state, a set pulse SP is applied, the polarity of which is of an opposite direction to that of the reset pulse RP as shown in FIG. 4(a). When the current value of the set pulse SP is gradually increased, the magnetization of the magnetization free layer is inversed at a certain current value and the resistance value of the magnetoresistive element 2 becomes a large value (high resistance state).

The result of inversion in the magnetoresistive element 2 is determined by the comparator 5 and the result is added/averaged by the integrator 6. By comparing the output value from the integrator 6 with a value of an input IPM of the mean value of inversion probability (that is, probability of generation of an event corresponding to "0" or "1"), and the magnitude of the set current is adjusted by the resultant error output value. With this construction, digitized random numbers whose probability of generation of each event is 0.5 can be obtained.

In the above-mentioned circuit, binarized random numbers having any desired probability of generation of between 0 and 1 can be obtained by setting the input value of inversion probability at any desired value other than 0.5.

Third Embodiment (Example of High-Rate Action, Integration, and Low Power Consumption)

The rate of current injection magnetization inversion is very high and it has been reported based on the experiment using a CPP-GMR element (see, Non-Patent Document 5 (i.e., experiment that indicates that the current injection magnetization inversion in the CPP-GMR element takes place in about 200 ps) that magnetization inversion occurs using current pulses of several hundreds picoseconds width. Therefore, employing the current pulses of 1 ns to 10 ns width for resetting current and setting current, the random number generating device according to the present invention can be operated. In this condition, the generation rate of random numbers is estimated to become around 100 megabits/second. This rate is 1,000 times the generation rate of random numbers so far reported (see Non-Patent Reference 2).

Since the current injection magnetization inversion type magnetoresistive element may be fabricated by the existing integrated circuit technology and therefore the size of circuit size is as small as about 100 nanometers square (100 nm×100 nm), the random number generating devices according to the present invention can be arrayed as an integrated circuit, so that the rate of generation of random numbers can be further increased. With the random number generating device according to the present invention, energy required for generating 1 bit of a random number is no more than 1 nanojoule when a CPP-GMR element is used, and no more than 10 nanojoules when an MgO-TMR element is used. Further with the random number generating device according to the present invention, pulsed current is applied only when random numbers are generated and no electric power is required for retaining the result (i.e., having nonvolatility for prepared random numbers), so that the random number generating device according to the present invention is characterized by very low power consumption.

Fourth Embodiment (Example in which Co—Fe—B Based Material)

Preferably, the magnetoresistive element used in the random number generating device according to the present invention has a large magnetoresistance ratio and high durability. An example of the magnetoresistive element having a large magnetoresistance ratio is an MgO-TMR element having an interlayer consisting of crystalline magnesium oxide. It has been known that the MgO-TMR element can be fabricated by sputtering method using Co—Fe—B alloy as the electrode material.

In this case, by adding other metal material (at least one element selected from Ni, V, Mo, and Cr) to the Co—Fe—B alloy, magnetization can be decreased. Since energy and anisotropic magnetic energy are in a proportional relationship to each other, it is possible to decrease thermal stability of the magnetoresistive element by decreasing the magnetization. In particular, when Ni is added, the magnetization is decreased and magnetostriction is reduced, so that the durability of the element can be increased.

Therefore, by employing an MgO-TMR element as the magnetoresistive element for use in the random number generating device according to the present invention and Co—Fe—B based material for at least one of the magnetization free layer and the magnetization fixed layer, the handleability of the random number generating device can be increased through adjustment of thermal stability, and the durability of the random number generating device can be increased through reduction in magnetostriction.

Fifth Embodiment (Example in which a Perpendicular Magnetic Material is Used)

It is desirable to use a magnetoresitive element having a small amount of magnetization inversion current for the random number generating device according to the present invention. One method for decreasing magnetization inversion current includes a method in which a perpendicular magnetic material is used. The magnetoresistive element in which the perpendicular magnetic material is used does not require shape magnetic anisotropy, so that the cross-sectional area of the element can be reduced to less than ½, compared with the in-plane type magnetoresistive element. By reducing the cross-sectional area, the amount of current required for magnetization inversion can also be decreased. Examples of the perpendicular magnetic material thus far known include Fe—Pt- and Co—Pt-based materials.

In particular, in the case of Fe—Pt, when a CPP-GMR element having a structure of Fe—Pt/Au/Fe—Pt with a diameter of 60 nanometers is fabricated, inversion current of around 0.5 milliamperes can be achieved. Therefore, by using a perpendicular magnetic material for at least one of the magnetization free layer and the magnetization fixed layer as the magnetoresistive element for use in the random number generating device according to the present invention, the handleability of the random number generating device can be improved through a reduction in inversion current.

Figure 9:
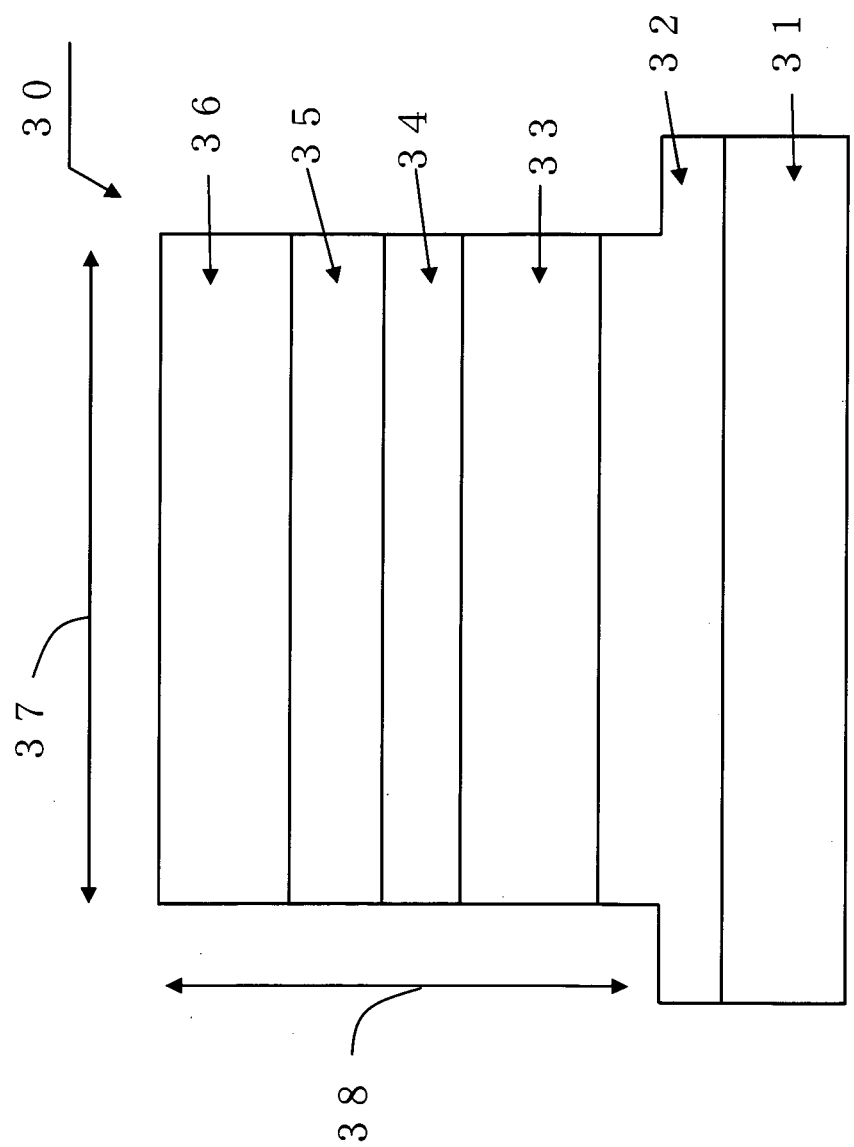
FIG. 9 shows a construction diagram illustrating a CPP-GMR element according to the present invention using a perpendicular magnetic material (here, Fe—Pt alloy)

FIG. 9 shows a construction diagram of a CPP-GMR element according to the present invention, where a perpendicular magnetic material (here Fe—Pt alloy) is employed. The element includes a magnetization free layer 35 and a magnetization fixed layer 33 each made of Fe—Pt alloy, and an interlayer 34 made of Au. Although not shown in FIG. 9, one or two atomic layers of Fe atoms are provided on the interface between the interlayer 34 and the magnetization free layer 35 and on the interface between the interlayer 34 and the magnetization fixed layer 33. The element has a columnar structure of circular cross section with 60 nmΦ (diameter), which is etched down to a buffer layer 32 with the etching depth (38) of about 20 nm.

The CPP-GMR element 30 shown in FIG. 9 has a structure including a substrate 31 and laminated layers thereon in order a buffer (layer) 32, a magnetization fixed layer 33 of a 4-nm-thick FePt layer, an interlayer 34 of a 2.7-nm-thick Au layer, a magnetic free layer 35 of a 1.7-nm-thick FePt layer, and a cap (layer) 36.

A sample of this element has a resistance of 5 Ω and a magnetoresistance ratio of 2%.

Figure 10:
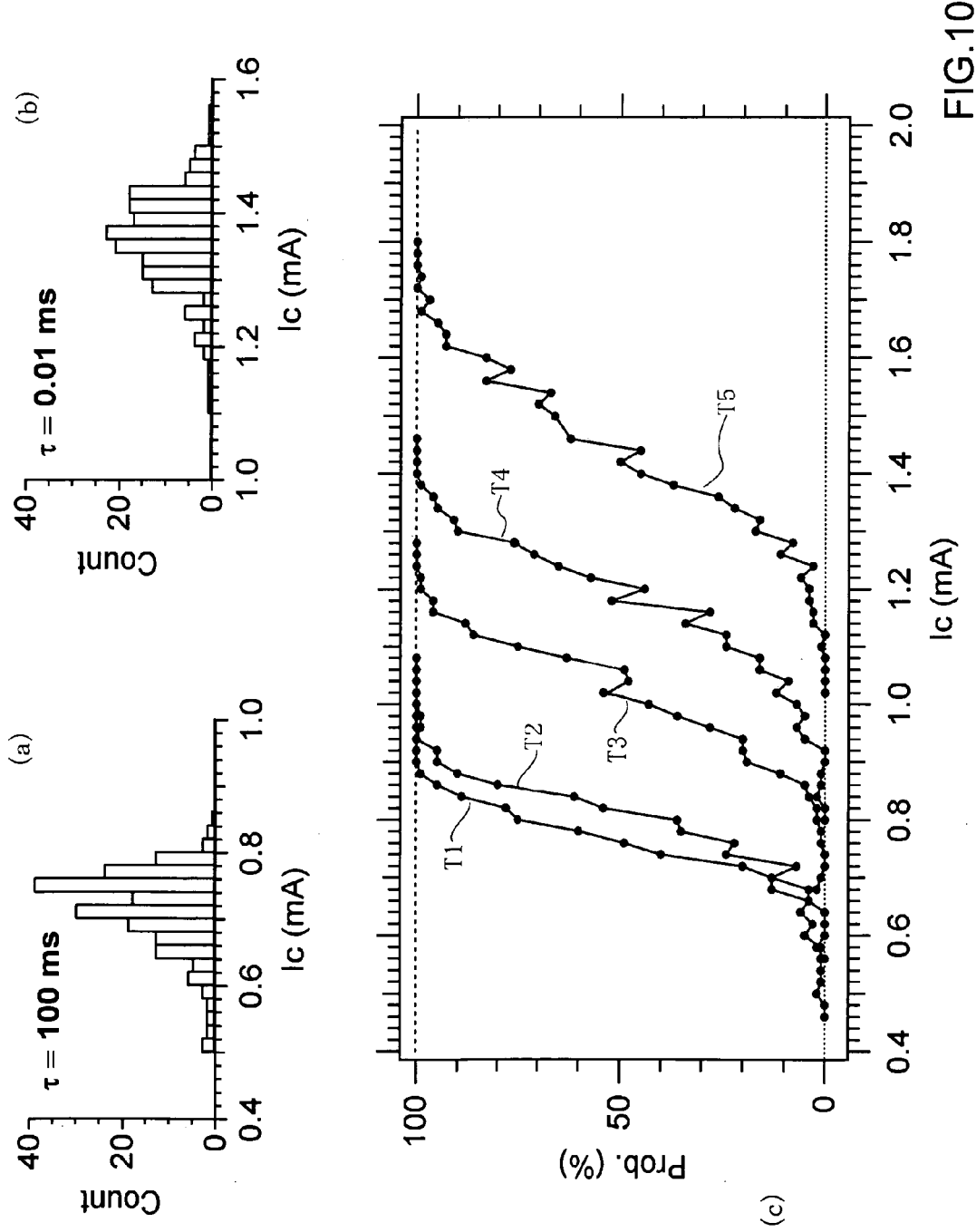
FIG. 10 shows diagrams illustrating fluctuation characteristics of magnetization inversion current in current injection magnetization inversion and inversion probability characteristic when multiple measurements are performed with fixing set current in the CPP-GMR element using the perpendicular magnetic material according to the present invention.

FIG. 10 shows diagrams illustrating magnetization inversion current variance characteristics in current injection magnetization inversion and inversion probability characteristics obtained by a plurality of measurements performed with fixed set current in a CPP-GMR element with the perpendicular magnetic material used in the present embodiment. FIG. 10(a) illustrates variance characteristics of magnetization inversion current when the pulse width was set to be 100 ms, FIG. 10(b) illustrates variance characteristics of magnetization inversion current when the pulse width was set to 0.01 ms, and FIG. 10(c) illustrates inversion probability characteristics when a plurality of measurements were done with a fixed set current.

In this experiment, though not shown, a current pulse width (τ) was varied from 100 msec as shown in FIGS. 10(a) to 0.01 msec as shown in FIG. 10(b). As shown in FIG. 10(c), when the pulse width is decreased, an average value of the inversion current increases and in parallel its variance is increased. From the results of experiment on inversion probability where the same set current has been applied, it has been confirmed that the inclination of the inversion probability to the set current is more moderate as the pulse width becomes smaller. That is, by using a smaller pulse width is used, the inclination of the characteristic curve can be made more moderate, so that adjustment of the inversion probability to a desired value becomes easier.

That is, as the pulse width is decreased from $T_1=100$ ms, through $T_2=10$ ms, $T_3=1$ ms, and $T_4=0.1$ ms, to $T_5=0.01$ ms, the inclination of the inversion probability-magnetization inversion current characteristic curve becomes more moderate, and in parallel the range of magnetization inversion current (current range) becomes higher.

Sixth Embodiment (Example in which a Heusler Alloy Material is Used)

It is desirable that the magnetoresistive element used in the random number generating device according to the present invention has a large magnetoresistance ratio. The magnetoresistive element having a large magnetoresistance ratio includes a magnetoresistive element in which the Heusler alloy is used in the magnetization free layer or the magnetization fixed layer. The band structure of the Heusler alloy would suggest that the alloy can be a perfect polarization material having a polarizability of 100%. It can be said that the magnetoresistance ratio can further be increased by using such a material. Therefore, the circuit for detecting a change in resistance ratio can be simplified by increasing the magnetoresistance ratio. The Heusler alloy material is constituted by, for example, Co—Mn—Si alloy or Co—Mn—Al alloy.

Therefore, as the magnetoresistive element used in the random number generating device according to the present invention, the magnetoresistance ratio can be improved and the circuitry of the random number generating device can be simplified by using the Heusler alloy material in at least one of the magnetization fixed layer and magnetization free layer.

Seventh Embodiment (Example of a Method of Inversion in which Magnetic Field is Used)

In the first embodiment and the second embodiment, current injection magnetization inversion was used as the method of magnetization inversion. In those cases, it was necessary to minimize the size of the magnetoresistive element so as to have a cross-sectional area of, for example, 100 nm square or less. In the case of a magnetoresistive element that has a cross-sectional area larger than 100 nm square, the magnetization can be inverted with magnetic field. In addition, according to a thermal stability model, which indicates that current and magnetic field can be handled as equivalents as external fields, pulsed magnetic field can be used as a method for stochastically inverting the magnetization in the same manner as pulsed current.

The method for providing pulsed magnetic field includes a method in which a wire is set near a magnetoresistive element and a magnetic field is generated by applying pulse current. This method is used for a magnetic field writable magnetic random access memory. In this method, the inversion probability of the magnetization free layer can be adjusted by varying the intensity of the pulsed magnetic field.

Therefore, the inversion method by magnetic field can be used as the magnetization inversion method for the magnetoresistive element for use in the random number generating according to the present invention. Employing inversion by magnetic field, it becomes possible to use a magnetoresistive element having a size of 100 nm square in the random number generating device according to the present invention, so that difficulty in its fabrication can be reduced.

Eighth Embodiment (Method for Equalizing Probability of Events in Random Numbers)

With the random number generation device according to the present invention, the probability of each event of binarized random numbers can be adjusted to any "predetermined value", for example, 0.5 by controlling an external field. However, in some cases it may be difficult to provide a circuit that controls the external field due to requirements for faster operation and simplification of the random number generating circuit and so on.

In such cases, random numbers of which probabilities of generation of "0" and "1" are equal to each other can be obtained as follows. That is, a certain external field is applied such that probability of each event is approximately 0.5 in advance and results of two independent measurements (for example, results of two continuous measurements or results of two every other measurements) are selected. Then, a combination of "success of inversion-failure of inversion" is related to "0", and a combination of "failure of inversion-success of inversion" is related to "1" (or vice versa).

For example, a case may be supposed that the probability of generation of success of inversion is 0.3 as the "predetermined value" (in other words, the probability of failure of inversion is 0.7). Then the probability of generation of "success of inversion-failure of inversion" is 0.3×0.7=0.21 while the probability of generation of "failure of inversion-success of inversion" is 0.7×0.3=0.21 in the above-mentioned two independent measurements, so that the probabilities of two events are the same. In this case, the results of measurements "success of inversion-failure of inversion" is reevaluated as a random number "0", and the results of measurements "failure of inversion-success of inversion" is reevaluated as a random number "1". In this case, however, the results of measurements "failure of inversion-failure of inversion" and "success of inversion-success of inversion" are discarded without reevaluations. Any results of measurements may be adopted. For example, results of three or more independent or discrete measurements may be used. In this case, results of measurements of any times, for example, "failure of inversion-success of inversion" in the above-mentioned results of two independent measurements or results of three or more independent measurements is used as a "selection pattern".

What is mentioned above means that random numbers having equivalent probabilities of generation can be obtained by newly assigning "success of inversion-failure of inversion" to "0" and "failure of inversion-success of inversion" to "1", making use of the fact that assuming the probability of inversion is p (0<p<1), the probability of non-inversion is 1−p, so that the probability of generation of "success of inversion-failure of inversion" and that of "failure of inversion-success of inversion" are both p(1−p).

Figure 11:
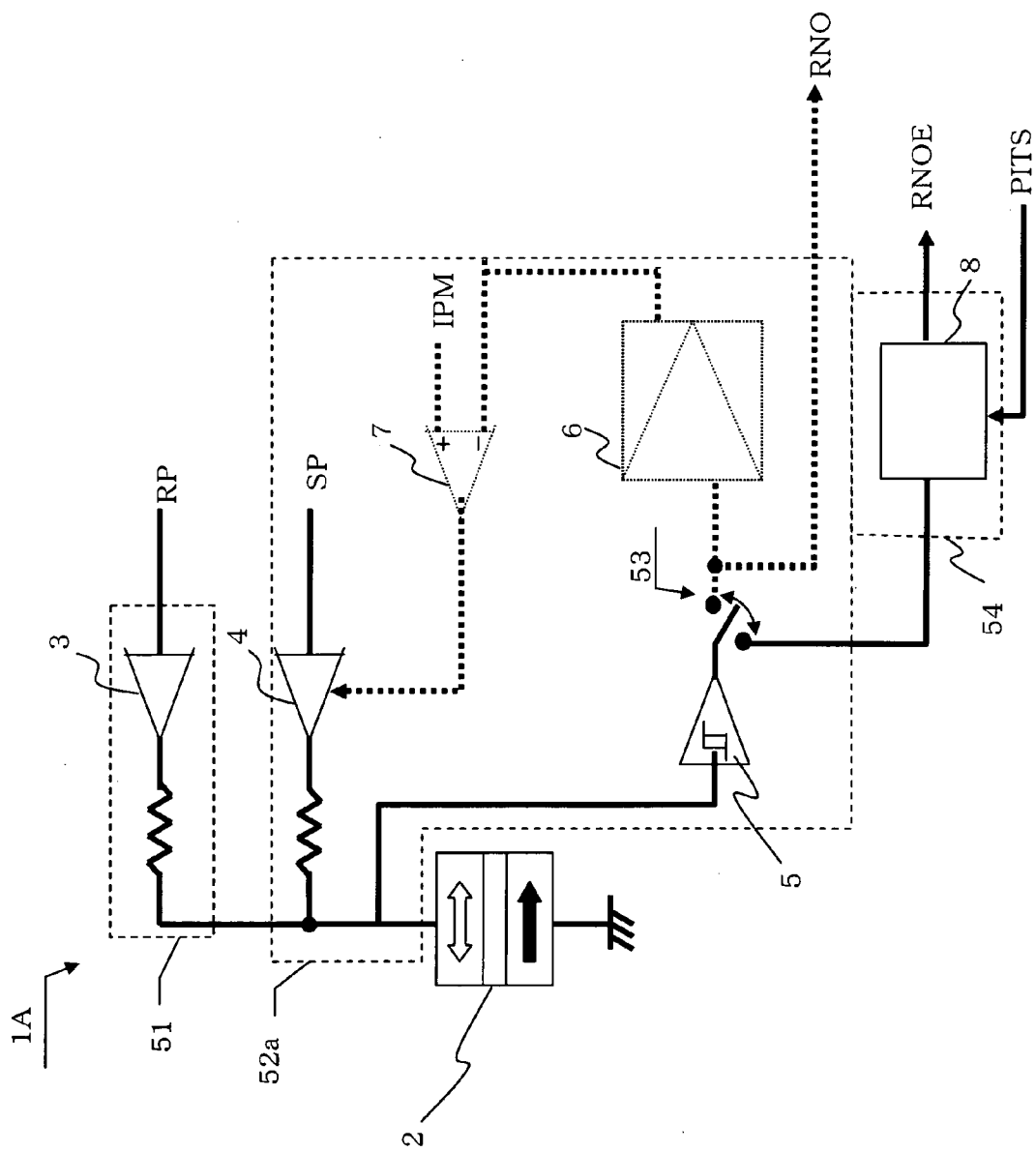
FIG. 11 is a construction diagram illustrating a random number generating device provided with means for making probabilities of events equal according to the present invention.

FIG. 11 is a construction diagram illustrating of the random number generating device with means for equalizing probabilities of respective events according to the present invention.

The construction of a random number generating device 1A as shown in FIG. 11, as compared with the construction as shown in FIG. 8, is featured in that a random number selection circuit 8 is connected to a random number output terminal of the device. New random numbers with equal probabilities of generation can be obtained by inputting the above-mentioned selection pattern and "0" or "1" related thereto to the random number selection circuit 8.

A feedback circuit (circuit 1) and the random number selection circuit 8 (circuit 2) are selectively connected to an output terminal of a comparator 5 through a switch SW53, the circuit 1 including an integrator 6 that integrates a random number output RNO to output an integrated output value and an error amplifier 7 that compares the integrated output value with an average inversion probability IPM, and inputting the compared error into a gain variable amplifier 4 for adjustment.

The feedback circuit has been substantially explained in the description related to FIG. 8 and thus further explanation on this drawing is omitted here.

The random number selection circuit 8 has a function to perform the method of equalizing the probabilities of respective events on random numbers as explained in the eighth embodiment based on the selection pattern RITS from the selection pattern inputting terminal.

Here, the buffer amplifier 3 connected to the magnetoresistive element 2 constitutes the reset means 51. In the circuit illustrated in FIG. 11, the current setting means 52a is constituted with the circuit portion excluding the buffer amplifier 3, the magnetoresistive element 2, and random number selection means 54 including the random number selection circuit 8.

The circuit portion drawn with broken lines in FIG. 11, that is, the integrator 6 and the error amplifier 7, may be omitted and the random number selection circuit 8 may be connected to the comparator 5 directly.

As explained above, the random number generating devices 1 and 1A according to the present invention allow for fast operation and are suitable for integration. Therefore, the above-mentioned method is more effective than providing each magnetoresistive element with a control circuit for controlling external field as the method for improving uniformity of probabilities of generation of random numbers.

By using this method, random numbers consisting of any integers having equal probabilities of generation can be obtained with ease. For example, random numbers consisting of three values having equal probabilities of generation can be obtained by allotting "failure of inversion-failure of inversion-success of inversion" to "0", "failure of inversion-success of inversion-failure of inversion" to "1", and "success of inversion-failure of inversion-failure of inversion" to "2".

By relating in the same manner, random numbers consisting of any values can be generated.

The random number generating devices shown in FIGS. 8 and 11 may be constituted by a computer equipped with a arithmetic processing circuit such as a CPU and so on, which is obvious to skilled artisan except for the magnetoresistive element.

INDUSTRIAL APPLICABILITY

A random number generating device can be realized, which is small in size, needs little electricity to work, and allows for generation of random numbers with high trueness at high rates and in a nonvolatile manner. By incorporating the random number generating device in IC card, cellular phone, portable computer, and so on, a system with high security can be realized. Thus, the present invention provides enormous industrial merits.

The invention claimed is:

1. A random number generating device, comprising:
   a magnetoresistive element that includes a magnetization free layer, an interlayer, and a magnetization fixed layer, the magnetoresistive element having a resistance value that changes between at least two resistance states depending on a magnetization direction of the magnetization free layer relative to the magnetization fixed layer;
   a first circuit component generating random numbers based the resistance value of the magnetoresistive element; and
   a second circuit component that applies an external field to the magnetoresistive element, the external field being adapted to adjust an inversion probability of the magnetization direction of the magnetization free layer to any desired value greater than 0 and less than 1.

2. A random number generating device according to claim 1, wherein the external field is applied via a current pulse, a magnetic field pulse, or both a current pulse and a magnetic field pulse.

3. A random number generating device according to claim 1, wherein the external field is applied via a current pulse such that variance of magnetization inversion current in the magnetization free layer of the magnetoresistive element is within the range of 0.1% to 30% with respect to a mean inversion current value.

4. A random number generating device according to claim 1, wherein a thermal stability index of the magnetization free layer of the magnetoresistive element is within the range of 3 to 100, the thermal stability index being defined to be a ratio $(K_u \cdot V)/(k_B \cdot T)$ of magnetic anisotropy energy $K_u \cdot V$ ($K_u$: magnetic anisotropic energy per unit volume, V: volume of the magnetization free layer) to environment thermal energy $k_B \cdot T$ ($k_B$: Boltzmann constant, T: absolute temperature).

5. A random number generating device, comprising:
   a magnetoresistive element that includes a magnetization free layer, an interlayer, and a magnetization fixed layer, the magnetization free layer having a magnetization direction that is capable of being set to at least two directions relative to the magnetization fixed layer;
   a circuit component that applies an external field to the magnetoresistive element, the external field being adapted to adjust an inversion probability of the magnetization direction of the magnetization free layer to any desired value greater than 0 and less than 1; and
   a comparator that outputs one of "0" of "1" in correspondence with a success of inversion and outputs the other of "0" of "1" in correspondence with a failure of inversion.

6. A random number generating device according to claim 5, wherein the external field is applied via a current pulse, a magnetic field pulse, or both a current pulse and a magnetic field pulse.

7. A random number generating device according to claim 5, further comprising
   a new random number selection circuit that, when a probability of the comparator outputting each of "0" or "1" is not 0.5, outputs one of "0" of "1" in response to two consecutive random numbers output from the comparator indicating a failure of inversion then a success of inversion, and outputs the other of "0" of "1" in response to two consecutive random numbers output from the comparator indicating two consecutive random numbers output from the comparator indicate a success of inversion then a failure of inversion.

8. A random number generating device, comprising:
   a magnetoresistive element that includes a magnetization free layer, an interlayer, and a magnetization fixed layer, the magnetoresistive element having a resistance value that changes between at least two resistance states depending on a magnetization direction of the magnetization free layer relative to the magnetization fixed layer;
   a circuit component that applies an external field to the magnetoresistive element such that an inversion probability P of the magnetization direction of the magnetization free layer is greater than 0 and less than 1 (0<P<1); and
   a generator that generates random numbers based the resistance value of the magnetoresistive element.

9. A random number generating device according to claim 8, wherein the external field is applied via a current pulse, a magnetic field pulse, or both a current pulse and a magnetic field pulse.

10. A random number generating device, comprising:
    a magnetoresistive element that includes a magnetization free layer, an interlayer, and a magnetization fixed layer, the magnetoresistive element having a resistance value that changes between at least a low resistance state and a high resistance state depending on a magnetization direction of the magnetization free layer relative to the magnetization fixed layer;
    a circuit component that applies an external field to the magnetoresistive element such that an inversion probability P of the magnetization direction of the magnetization free layer is greater than 0 and less than 1 (0<P<1); and
    a generator that generates random numbers based the resistance value of the magnetoresistive element by generating one of "0" of "1" in correspondence with the low resistance state and the other of "0" of "1" in correspondence with the high resistance state.

11. A random number generating device according to claim 10, wherein the external field is applied via a current pulse, a magnetic field pulse, or both a current pulse and a magnetic field pulse.

12. A method for generating random numbers of "new 0" and "new 1", comprising:
- operating a random number generating device according to claim 5; and
- outputting one of "0" of "1" in response to two consecutive random numbers output from the comparator indicating a failure of inversion then a success of inversion; and
- outputting the other of "0" of "1" in response to two consecutive random numbers output from the comparator indicating two consecutive random numbers output from the comparator indicate a success of inversion then a failure of inversion.

* * * * *